US012752552B2

(12) United States Patent
Moriyama

(10) Patent No.: US 12,752,552 B2
(45) Date of Patent: Oct. 6, 2026

(54) RECORDING DEVICE AND RECORDING METHOD OF RECORDING DEVICE

(71) Applicant: SEIKO EPSON CORPORATION, Tokyo (JP)

(72) Inventor: Ryuji Moriyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 116 days.

(21) Appl. No.: 18/979,758

(22) Filed: Dec. 13, 2024

(65) Prior Publication Data

US 2025/0196516 A1 Jun. 19, 2025

(30) Foreign Application Priority Data

Dec. 13, 2023 (JP) ................................ 2023-209942

(51) Int. Cl.

*B41J 11/20* (2006.01)
*B41J 11/00* (2006.01)
*B41J 11/06* (2006.01)
*B41J 11/14* (2006.01)
*B41J 25/00* (2006.01)
*B41M 7/00* (2006.01)

(52) U.S. Cl.

CPC .......... *B41J 11/20* (2013.01); *B41J 11/00212* (2021.01); *B41J 11/00214* (2021.01); *B41J 11/0095* (2013.01); *B41J 11/06* (2013.01); *B41J 11/14* (2013.01); *B41J 25/001* (2013.01); *B41M 7/0081* (2013.01)

(58) Field of Classification Search

CPC ....................... B41J 11/00212; B41J 11/00214
See application file for complete search history.

(56) References Cited

U.S. PATENT DOCUMENTS

2022/0339948 A1* 10/2022 Nakagawa ......... B41J 11/00218
2023/0072353 A1* 3/2023 Riley ...................... B05B 12/12

FOREIGN PATENT DOCUMENTS

JP 2011148126 A * 8/2011 ........ B41J 11/00212
JP 2020-062828 A 4/2020

* cited by examiner

*Primary Examiner* — Julian D Huffman
(74) *Attorney, Agent, or Firm* — Dority and Manning, P.A.

(57) ABSTRACT

A recording device including a medium support unit configured to support a medium, a recording unit configured to record an image on the medium with an ink of ultraviolet curing type, an irradiation unit configured to irradiate the medium with an ultraviolet ray, a detection unit configured to detect a height of the medium, and a control unit configured to execute, when a height equal to or greater than a threshold is detected by the detection unit at a time of recording of an image by the recording unit, first control of stopping recording of an image by the recording unit, second control of causing a distance between the medium support unit and the recording unit to be greater than the distance before the detection unit detects a height equal to or greater than the threshold, and third control of irradiating the medium with an ultraviolet ray by the irradiation unit.

12 Claims, 3 Drawing Sheets

RECORDING DEVICE AND RECORDING METHOD OF RECORDING DEVICE

The present application is based on, and claims priority from JP Application Serial Number 2023-209942, filed Dec. 13, 2023, the disclosure of which is hereby incorporated by reference herein in its entirety.

BACKGROUND

1. Technical Field

The present disclosure relates to a recording device and a recording method of the recording device.

2. Related Art

There is a known adjustment device configured to adjust a positional relationship between a printing medium and a recording unit.

For example, JP 2020-62828 A includes a detection mechanism configured to detect the height of the upper end of a print medium in order to adjust the distance in an up-down direction between the print medium and an inkjet head.

However, if a jig fixing the medium is damaged or the sticking tool is peeled off in the middle of printing, the detection mechanism detects an abnormality in the height and interrupts printing in the middle. When a user immediately removes the medium from the recording device in a state where the printing is interrupted, there is a problem that the ink drips from the medium due to insufficient irradiation of the ultraviolet ray, and the use environment of the user is contaminated.

SUMMARY

The present disclosure is a recording device including a medium support unit configured to support a medium, a recording unit configured to record an image on the medium with an ink of ultraviolet curing type, an irradiation unit configured to irradiate the medium with an ultraviolet ray, a detection unit configured to detect a height of the medium, and a control unit configured to execute, when a height equal to or greater than a threshold is detected by the detection unit at a time of recording of an image by the recording unit, first control of stopping recording of an image by the recording unit, second control of causing a distance between the medium support unit and the recording unit to be greater than the distance before the detection unit detects a height equal to or greater than the threshold, and third control of irradiating the medium with an ultraviolet ray by the irradiation unit.

The present disclosure is a recording method of causing a processor mounted on a recording device including a medium support unit configured to support a medium, a recording unit configured to record an image on the medium with an ink of ultraviolet curing type, an irradiation unit configured to irradiate the medium with an ultraviolet ray, and a detection unit configured to detect a height of the medium to execute, the recording method including when a height equal to or greater than a threshold is detected by the detection unit at a time of recording of an image by the recording unit, stopping recording of an image by the recording unit, causing a distance between the medium support unit and the recording unit to be greater than the distance before the detection unit detects a height equal to or greater than the threshold, and irradiating the medium with an ultraviolet ray by the irradiation unit.

DESCRIPTION OF EMBODIMENTS

1. Overall Configuration of Recording Device

A recording device 1 according to a first embodiment will be described below with reference to the drawings.

Figure 1:
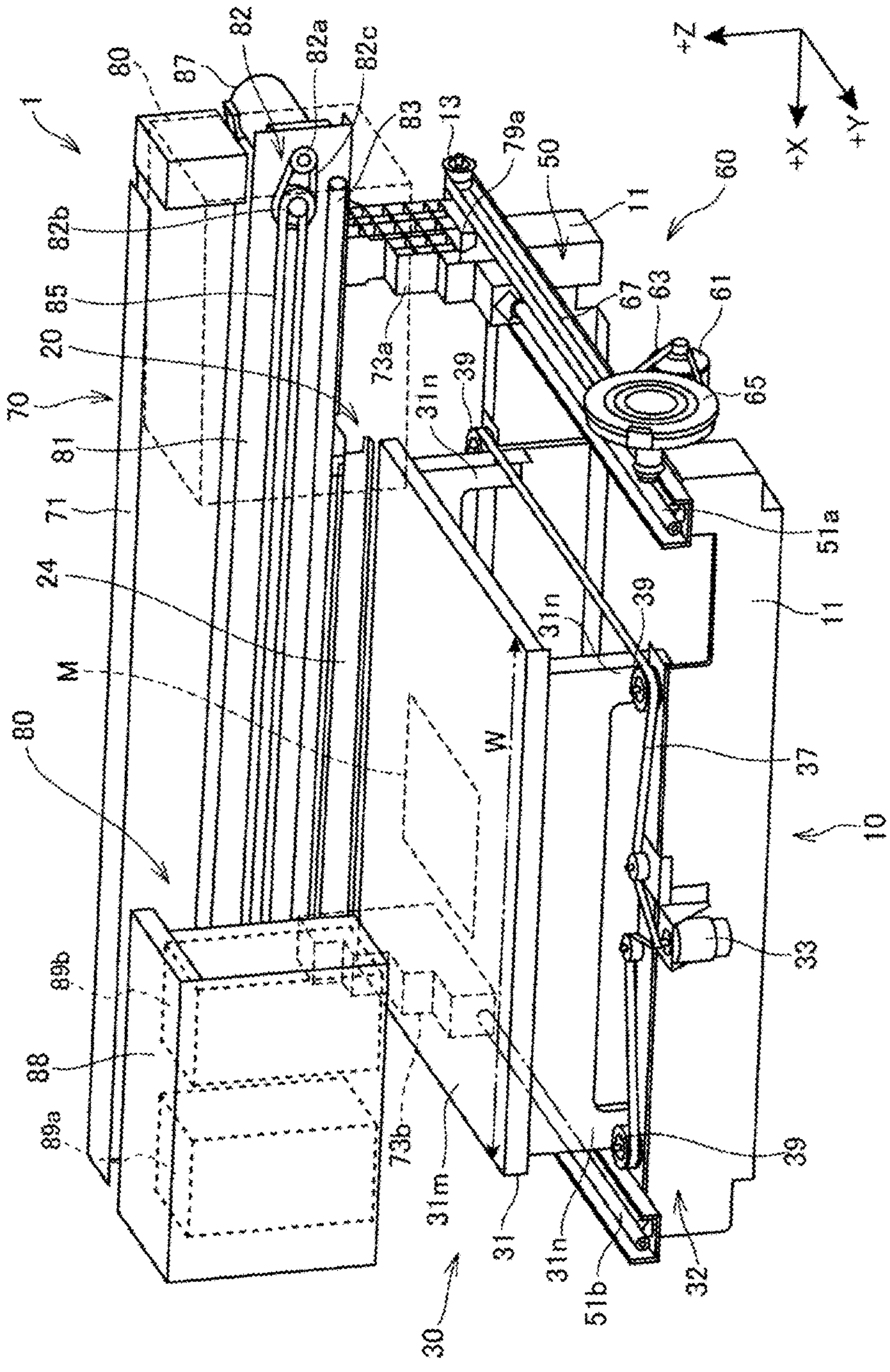
FIG. 1 is a perspective view of a recording device.

FIG. 1 is a perspective view of the recording device 1.

The recording device 1 illustrated in FIG. 1 is a device configured to perform recording on a medium M by discharging a fluid onto the medium M by a recording head 89*a*. The medium M is a sheet, cloth, or a three-dimensional object. The sheet may be a sheet made of paper or a synthetic resin. The cloth may be any of nonwoven fabric, knit, and woven fabric. The three-dimensional object includes adornments such as clothes and shoes, daily necessities, machine components, and various other objects. The type of the fluid discharged onto the medium M by the recording device 1 is not limited, as long as it has fluidity. For example, the recording device 1 is a printer configured to eject ink of one or a plurality of colors toward the surface of the medium M by the recording head 89*a* to form an image on the medium M. In this case, the medium M corresponds to a printing medium.

FIG. 1 illustrates an X-axis, a Y-axis, and a Z-axis. The X-axis, the Y-axis, and the Z-axis are orthogonal to one another. The Z-axis is an axis extending in an up-down direction, and can also be called an axis extending in a vertical direction. The X-axis and the Y-axis are parallel to a horizontal plane. In the following description, a direction along the X-axis is called a left-right direction, and a direction along the Y-axis is called a front-rear direction. The left-right direction, which is a direction along the X-axis, corresponds to a first direction, and the front-rear direction along the Y-axis corresponds to a second direction. Specifically, a forward direction along the Z-axis is an upward direction, a forward direction along the X-axis is a rightward direction, and a forward direction along the Y-axis is a front direction. The X-axis, the Y-axis, and the Z-axis in FIG. 1 indicate the same directions in each of the drawings described later. The X-axis corresponds to the second axis, and the Y-axis corresponds to the first axis.

The recording device 1 includes a table 31 configured to support the medium M. The table 31 is a table that does not move in the X-axis direction and the Y-axis direction. The upper surface of the table 31 is a medium support unit 31*m*. The medium support unit 31*m* is a flat surface on which the medium M can be placed. The shape and size of the medium M are not limited within a range not protruding from the medium support unit 31*m*. An end of the medium M may protrude from the medium support unit 31*m*. The height of the medium M corresponds to the size of the medium M in the +Z-axis direction. The height of the medium M may be any size within a range in which the table 31 can be lifted and lowered as described later.

The recording device 1 supports the medium M so as not to move by the medium support unit 31*m*, and causes the recording head 89*a* to scan above the medium M supported by the medium support unit 31*m* to discharge a fluid from the recording head 89*a* to the medium M.

The recording device 1 includes a body portion 10 and a moving portion 70. The body portion 10 is a seating fixed to an installation surface on which the recording device 1 is installed. The moving portion 70 moves along the Y-axis with respect to the body portion 10.

The body portion 10 includes a base portion 11, a medium support mechanism 30, and a drive mechanism 50. The base portion 11 is fixed to the installation surface of the recording device 1 to support each unit of the recording device 1. FIG. 1 illustrates an example in which a pair of base portions 11 having a rod shape are arranged side by side along the X-axis.

The medium support mechanism 30 includes the table 31 and a height movement mechanism 32. The table 31 includes a rectangular flat plate and four table legs 31*n* arranged at four corners of the flat plate, and the upper surface of the flat plate is the medium support unit 31*m* described above.

The height movement mechanism 32 includes a lifting motor 33, a lifting belt 37, and a lifting mechanism 39, and moves the medium support unit 31*m* in a direction along the Z-axis. The lifting motor 33, the lifting belt 37, and the lifting mechanism 39 correspond to a second drive unit.

The lifting mechanism 39 is provided to each of the four table legs 31*n*. The lifting mechanism 39 includes a ball screw disposed along the Z-axis, a nut screwed to the ball screw, and a pulley. The ball screw of the lifting mechanism 39 is rotatably supported by the base portion 11. The nut of the lifting mechanism 39 is fixed to the table leg 31*n*. The pulley of the lifting mechanism 39 is fixed to an upper portion of the ball screw. When the pulley of the lifting mechanism 39 rotates, the ball screw rotates, and the table leg 31*n* moves along the Z-axis together with the nut in accordance with the rotation of the ball screw.

The lifting motor 33 rotates in accordance with the control of a control unit 100 described later. The control unit 100 controls a rotation direction and a rotation amount of the lifting motor 33. The lifting belt 37 is an annular belt stretched over an output shaft of the lifting motor 33 and pulleys of the four lifting mechanisms 39. The lifting belt 37 is circularly driven by the rotation of the lifting motor 33. The lifting belt 37 transmits the rotation of the lifting motor 33 to the pulleys of the four lifting mechanisms 39. Due to this, the ball screw of the lifting mechanism 39 rotates to move the table 31 along the Z-axis.

The rotation direction of the lifting motor 33 can be switched between a forward direction in which the table 31 is moved upward and a reverse direction in which the table 31 is moved downward. The recording device 1 lifts and lowers the table 31 by operating the lifting motor 33.

The drive mechanism 50 includes a first guide shaft 51*a*, a second guide shaft 51*b*, and a frame drive unit 60. The first guide shaft 51*a* and the second guide shaft 51*b* are shaft-shaped members stretched over between the pair of base portions 11 and arranged along the Y-axis. The first guide shaft 51*a* is fixed to the left end portion of the base portion 11, and the second guide shaft 51*b* is fixed to the right end portion of the base portion 11.

Note that the first guide shaft 51*a* is positioned on the left side of the medium support unit 31*m*. The second guide shaft 51*b* is positioned on the right side of the medium support unit 31*m*.

The moving portion 70 includes a main frame 71, a first leg 73*a*, a second leg 73*b*, and a recording unit 80.

The main frame 71 is a plate-shaped member elongated in a direction along the X-axis. The size in the left-right direction of the main frame 71 is greater than that of the base portion 11. The first leg 73*a* is fitted with the first guide shaft 51*a*, and movable along the first guide shaft 51*a*. The second leg 73*b* is fitted with the second guide shaft 51*b*, and movable along the second guide shaft 51*b*. The main frame 71 is fixed onto the first leg 73*a* and the second leg 73*b*, and is supported from below by the first leg 73*a* and the second leg 73*b*. The first leg 73*a* is positioned at the left end portion of the main frame 71, and the second leg 73*b* is positioned at the right end portion of the main frame 71. The main frame 71 is guided by the first guide shaft 51*a* and the second guide shaft 51*b* together with the first leg 73*a* and the second leg 73*b*, and moves along the Y-axis.

The frame drive unit 60 includes a frame moving motor 61, a transmission belt 63, a speed change mechanism 65, and a transmission belt 67.

The frame moving motor 61 is a motor that rotates in accordance with the control of the control unit 100 described later. The transmission belt 63 is an annular belt stretched over between the output shaft of the frame moving motor 61 and the speed change mechanism 65, and transmits the driving force of the frame moving motor 61 to the speed change mechanism 65. The speed change mechanism 65 includes a first pulley and a second pulley, the transmission belt 63 is wound around the first pulley, and a transmission belt 67 is wound around the second pulley. The speed change mechanism 65 drives the transmission belt 67 by rotating the second pulley with the driving force transmitted from the transmission belt 63 to the first pulley. The speed change mechanism 65 transmits the driving force of the frame moving motor 61 to the transmission belt 67 at a reduction ratio corresponding to the ratio of the diameters of the first pulley and the second pulley.

The transmission belt 67 is an annular belt stretched over between the speed change mechanism 65 and a pulley 13 disposed at an end portion in the −Y-axis direction of the base portion 11. The pulley 13 is installed rotatably with respect to the base portion 11. The transmission belt 67 is disposed along the first guide shaft 51*a*. The first leg 73*a* is fixed to the transmission belt 67 through a belt coupling portion 79*a*. Therefore, when the transmission belt 67 is circularly driven, power for moving the first leg 73*a* along the Y-axis acts on the first leg 73*a*. Due to this, the moving portion 70 moves along the Y-axis.

The rotation direction of the frame moving motor 61 can be switched between a forward direction in which the main frame 71 is moved in the +Y-axis direction and a reverse direction in which the main frame 71 is moved in the −Y-axis direction. The recording device 1 moves the main frame 71 forward and rearward by operating the frame moving motor 61.

The second leg 73*b* of the moving portion 70 is guided by the second guide shaft 51*b*. Due to this, the main frame 71 moves in parallel in the +Y-axis direction and the −Y-axis direction along the first guide shaft 51*a* and the second guide shaft 51*b*.

A carriage support frame 81, a transmission mechanism 82, a carriage guide shaft 83, and a carriage driving motor 87 are installed on the main frame 71. The recording unit 80 includes a carriage 88. The carriage 88 includes the recording head 89*a* and an irradiation unit 89*b*.

The carriage support frame 81 is a plate-like member elongated in a direction along the X-axis. The carriage guide shaft 83 is fixed along the X-axis at the carriage support frame 81. The carriage 88 is supported by the carriage support frame 81 and the carriage guide shaft 83, and is movable along the carriage guide shaft 83. In a range where the carriage 88 moves along the X-axis, the left end position is a home position. At the home position, a mechanism for performing maintenance such as flushing and cleaning of the recording head 89*a* is disposed. In FIG. 1, the home position of the carriage 88 is indicated by a broken line.

Note that when the carriage 88 is positioned at the home position, the carriage 88 does not overlap the medium support unit 31*m* in the X-axis.

A carriage driving belt 85 is an annular belt stretched over between the transmission mechanism 82 arranged at a left end portion of the carriage support frame 81 and a pulley not illustrated arranged at a right end portion of the carriage support frame 81. The carriage driving belt 85 is disposed along the carriage guide shaft 83.

The carriage driving motor 87 is a motor that rotates in accordance with the control of the control unit 100 described later.

The transmission mechanism 82 includes a pulley 82*a*, a two-stage pulley 82*b*, and a belt 82*c*. The pulley 82*a* is fixed to the output shaft of the carriage driving motor 87. The belt 82*c* is an annular belt stretched over between the pulley 82*a* and the two-stage pulley 82*b*. The two-stage pulley 82*b* includes a small pulley and a large pulley with a larger diameter than that of the small pulley. The belt 82*c* is wound around the large pulley, and the carriage driving belt 85 is wound around the small pulley. The belt 82*c* is circularly driven along with the rotation of the carriage driving motor 87 to rotate the large pulley of the two-stage pulley 82*b*. The small pulley of the two-stage pulley 82*b* rotates together with the large pulley to circularly drive the carriage driving belt 85. As described above, the rotation of the carriage driving motor 87 is transmitted to the carriage driving belt 85 at a reduction ratio corresponding to the ratio of the diameters of the large pulley and the small pulley in the two-stage pulley 82*b*.

The carriage 88 is coupled to the carriage driving belt 85. Therefore, when the carriage driving belt 85 is circularly driven, the carriage 88 moves along the X-axis. The carriage 88 is mounted with the recording head 89*a*. As the carriage 88 moves along the X-axis, the recording head 89*a* moves in the left-right direction, that is, in the +X-axis direction and the −X-axis direction. As the main frame 71 moves along the Y-axis, the recording head 89*a* moves in the front-rear direction, that is, in the +Y-axis direction and the −Y-axis direction. Therefore, the recording device 1 can move the recording head 89*a* in the front-rear direction and the left-right direction with respect to the table 31. Therefore, a fluid such as ink can be discharged onto the entire medium M supported on the table 31.

The recording head 89*a* includes a plurality of nozzles not illustrated for discharging the fluid. These nozzles are opened at the lower end surface of the recording head 89*a*. When the recording head 89*a* discharges a fluid from the nozzle, the discharged fluid flies between the lower end surface of the recording head 89*a* and the medium M placed on the table 31, and is impacted on the medium M. The distance between the lower end of the recording head 89*a* and the medium M is called a recording gap. In order to perform high-quality recording on the medium M, the recording device 1 has a function of adjusting the size of the recording gap. Specifically, by operating the lifting motor 33 to lift or lower the table 31, the recording device 1 adjusts the recording gap to an appropriate size.

The irradiation unit 89*b* includes an irradiation window not illustrated facing downward from the lower end surface of the carriage 88. The irradiation window is constituted by a plate made of a light-transmissive material. The irradiation unit 89*b* emits irradiation light from a light-source unit not illustrated through the irradiation window. The irradiation light emitted from the irradiation unit 89*b* passes between the irradiation window and the medium M placed at the table 31, and is emitted onto the medium M on which the recording has been performed by the recording head 89*a*. In the present embodiment, the irradiation unit 89*b* includes an ultraviolet light emitting diode (UV-LED) configured to emit ultraviolet rays, and the irradiation light is an ultraviolet ray. In other words, in the present embodiment, the irradiation unit 89*b* irradiates ink cured by the ultraviolet ray impacted on the medium M with the ultraviolet ray, and thus the ink is fixed onto the medium M.

The recording device 1 includes a height detection unit 20. The height detection unit 20 detects the height of the medium M placed on the table 31. The height of the medium M is the position of the upper end of the medium M in a direction along the Z-axis. The height detection unit 20 corresponds to a detection unit.

The height detection unit 20 includes a contact plate 24 disposed to protrude downward from the lower end of the main frame 71. The contact plate 24 is a plate-shaped member elongated in a direction along the X-axis. The contact plate 24 is attached pivotally about the X-axis with respect to the main frame 71. The contact plate 24 pivots and displaces when coming into contact with the medium M or the medium support unit 31*m*. An arm is formed on the contact plate 24, and the arm displaces with the displacement of the contact plate 24. The displacement of the arm is detected by a displacement sensor 27 illustrated in FIG. 2. The displacement sensor 27 is provided in the height detection unit 20. The displacement sensor 27 is, for example, a magnetic sensor, a reflective photosensor, or a transmissive photosensor. When the displacement sensor 27 detects the displacement of the arm, the height detection unit 20 detects the displacement of the contact plate 24.

When detecting that the contact plate 24 comes into contact with the medium M and displaces while the moving portion 70 moves forward or rearward, the recording device 1 determines that the relative position of the medium support unit 31*m* with respect to the main frame 71 on the Z-axis is high. In this case, the recording device 1 lowers the medium support unit 31*m* by the height movement mechanism 32. In this manner, the relative position of the medium M with respect to the recording head 89*a* on the Z-axis can be adjusted, and the recording gap can be adjusted to an appropriate size. Note that the lower end of the contact plate 24 is positioned below the lower end of the recording head 89*a* by a distance equivalent to a recording gap having an appropriate size.

In the X-axis, the position of the contact plate 24 overlaps the medium support unit 31*m*. Specifically, a range W where the medium support unit 31*m* is positioned in the X-axis and the contact plate 24 overlap. Therefore, use of the contact plate 24 can detect the relative position to the recording head 89*a* with respect to the entire medium M placed on the medium support unit 31*m*.

2. Configuration of Control System of Recording Device

Figure 2:
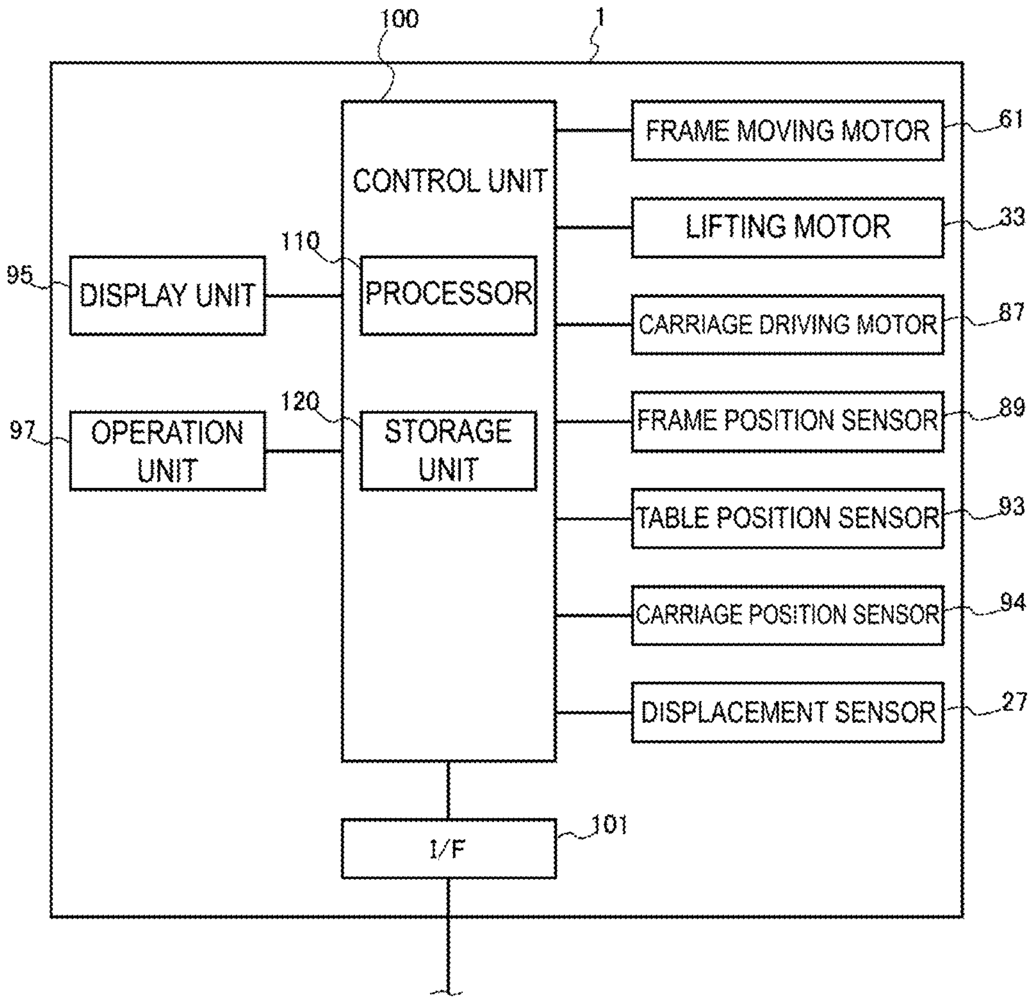
FIG. 2 is a block diagram illustrating a functional configuration of a control system of a recording device.

FIG. 2 is a block diagram illustrating the functional configuration of the control system of the recording device 1.

The recording device 1 includes the control unit 100. The control unit 100 includes a processor 110 such as a central processing unit (CPU) or a micro processing unit (MPU), and a storage unit 120.

The storage unit 120 includes a volatile storage unit and a nonvolatile storage unit. The volatile storage unit includes, for example, a random access memory (RAM). The non-volatile storage unit includes a read only memory (ROM), a hard disk, and a flash memory. The control unit 100 controls each unit of the recording device 1 by executing a program stored in the storage unit.

An interface (I/F) 101 is coupled to the control unit 100. The interface 101 is a communication device that executes wired communication using a cable or wireless communication using a wireless communication line. The interface 101 executes communication with a host computer not illustrated to receive recording data. The recording data includes data of images and characters to be recorded on the medium M by the recording device 1, a command for instructing recording execution of the recording device 1, and other data.

The lifting motor 33, the frame moving motor 61, the carriage driving motor 87, and the recording head 89*a* are coupled to the control unit 100. A frame position sensor 92, a table position sensor 93, a carriage position sensor 94, and the displacement sensor 27 are coupled to the control unit 100.

The frame position sensor 92 is a sensor configured to detect the position of the main frame 71 in the Y-axis. For example, the frame position sensor 92 is a linear encoder disposed along the first guide shaft 51*a*. The table position sensor 93 is a sensor configured to detect the position of the table 31 in the Z-axis. The table position sensor 93 is, for example, a rotary encoder configured to detect the rotation amount of the lifting motor 33 or a rotary encoder configured to detect the rotation amount of the ball screw of the lifting mechanism 39. The carriage position sensor 94 is a sensor configured to detect the position of the carriage 88 in the X-axis. For example, the carriage position sensor 94 is a linear encoder disposed along the carriage guide shaft 83. The control unit 100 specifies the position of the main frame 71, the position of the table 31, and the position of the carriage 88 based on detection values of the frame position sensor 92, the table position sensor 93, and the carriage position sensor 94.

A display unit 95 and an operation unit 97 are coupled to the control unit 100.

The display unit 95 includes a display panel such as, for example, a liquid crystal panel or an organic electro-luminescence (EL) panel, and causes the display pane to display an image under the control of the control unit 100.

The operation unit 97 includes an input device such as a keyboard, and receives a user's operation. The operation unit 97 corresponds to a reception unit.

The control unit 100 operates each motor based on the recording data received by the interface 101. Specifically, the control unit 100 moves the moving portion 70 along the Y-axis by controlling switching of the rotation direction of the frame moving motor 61 and start and stop of rotation of the frame moving motor 61. The control unit 100 moves the table 31 along the Z-axis by controlling switching of the rotation direction of the lifting motor 33 and start and stop of rotation of the lifting motor 33. The control unit 100 moves the carriage 88 along the X-axis by controlling switching of the carriage driving motor 87 and controlling start and stop of rotation of the carriage driving motor 87. In these controls, the control unit 100 uses detection values of the frame position sensor 92, the table position sensor 93, and the carriage position sensor 94.

The control unit 100 discharges a fluid by operating the recording head 89*a* based on the recording data received by the interface 101.

The control unit 100 performs adjustment of the recording gap in a state where the medium M is placed on the table 31. The control unit 100 operates the frame moving motor 61 to move the main frame 71 forward or rearward. By determining whether or not the arm displaced based on the detection value of the displacement sensor 27, the control unit 100 determines whether or not the contact plate 24 came into contact with the medium M or the table 31. When determining that the contact plate 24 came into contact with the medium M or the table 31, the control unit 100 operates the lifting motor 33 to lower the table 31.

3. Operation of Recording Device

Upon receiving the recording data via the interface 101, the control unit 100 of the recording device 1 operates the carriage driving motor 87 to move the carriage 88 to the home position. The control unit 100 operates the frame moving motor 61 to move the moving portion 70 to the front end in the Y-axis direction.

The control unit 100 causes the height detection unit 20 to execute height detection when moving the moving portion 70 in the Y-axis direction.

The time of moving the moving portion 70 in the Y-axis direction includes a time of moving the moving portion 70 present on the rear in the Y-axis direction to the front end in the +Y-axis direction before starting recording of an image. The time of moving the moving portion 70 in the Y-axis direction includes a time when recording of an image in the left-right direction, which is a direction along the X-axis, is completed, and the moving portion 70 is moved rearward in the Y-axis direction, that is, in the −Y-axis direction.

The control unit 100 causes the height detection unit 20 to execute height detection when moving the moving portion 70 to the front end in the +Y-axis direction. The height detection unit 20 includes a contact plate 24 disposed to protrude downward from the lower end of the main frame 71, and moves with movement of the moving portion 70. The height detection unit 20 executes height detection by detecting displacement of the arm by the displacement sensor 27.

If the height detection unit 20 detects a height equal to or greater than a preset threshold while the moving portion 70 moves to the front end in the +Y-axis direction, the control unit 100 causes the display unit 95 to display a guide display for guiding that an abnormality was detected.

Since the abnormality detected here is before recording of the image by the recording head 89*a* and before irradiation of the irradiation light by the irradiation unit 89*b*, the abnormality includes peeling of a fixing tool for fixing the medium M to the medium support unit 31*m* and erroneous setting. The erroneous setting includes, for example, height setting of the table 31.

Upon moving the moving portion 70 to the front end in the +Y-axis direction, the control unit 100 operates the carriage driving motor 87 to move the carriage 88 from the home position to the right. At this time, the carriage 88 is moved in the right direction until the position in the X-axis of the recording head 89*a* reaches the recording position, which is a position where recording is executed on the medium M in the X-axis. The control unit 100 reads, from the recording data, the position where recording is executed on the medium M in the X-axis. The control unit 100 grasps the position in the X-axis of the recording head 89*a* by reading the detection value of the carriage position sensor 94.

Upon moving the carriage 88 until the position in the X-axis of the recording head 89*a* is the recording position, the control unit 100 operates the recording head 89*a* and to execute recording on the medium M. The recording head 89*a* ejects ink onto the medium M, and the ink adhering to the medium M forms characters, images, and the like included in the recording data. When ejecting the ink onto the medium M by the recording head 89*a*, the control unit 100 causes the irradiation unit 89*b* to emit irradiation light to solidify the ink adhering to the medium M.

Upon completing the recording of the image in the left-right direction, which is the direction along the X-axis, the control unit 100 rotates the frame moving motor 61 by a predetermined amount to move the moving portion 70 in the −Y-axis direction, which is the rear in the Y-axis direction. The control unit 100 executes height detection by the height detection unit 20 when moving the moving portion 70 in the −Y-axis direction, which is the rear in the Y-axis direction.

The control unit 100 executes the first control, the second control, and the third control when the height detection unit 20 detects a height equal to or greater than a preset threshold. The control unit 100 executes the first control, the second control, and the third control in this order.

The first control is a control of stopping recording of an image by the recording head 89*a* of the recording unit 80. The second control is a control of expanding an interval between the medium support unit 31*m* and the recording unit 80 more than before the height detection unit 20 detects the height equal to or greater than the threshold.

The third control is a control of irradiating the medium M with irradiation light by the irradiation unit 89*b*.

The second control is executed in order to prevent failure of the recording head 89*a* due to collision of an obstacle with the recording head 89*a*. The obstacle includes, for example, a jig for fixing the medium M to the medium support unit 31*m*, and a member such as a tape for sticking the medium M to the medium support unit 31*m*.

In the present embodiment, as the second control, the control unit 100 operates the lifting motor 33, moves the medium support unit 31*m* downward in the Z-axis, and executes control of expanding the interval between the medium support unit 31*m* and the recording unit 80.

The control of expanding the interval between the medium support unit 31*m* and the recording unit 80 may be, for example, a control of lowering the medium support unit 31*m* downward by a preset fixed value.

Even if the medium support unit 31*m* is lowered downward by the preset fixed value, the medium support unit 31*m* may be further lowered by another preset fixed value when the height detection unit 20 detects a height equal to or greater than the threshold.

The medium support unit 31*m* may be lowered downward until the height detected by the height detection unit 20 becomes smaller than the threshold.

The timing at which the second control is executed will be described.

After executing the first control and stopping the recording of the image by the recording head 89*a*, the control unit 100 decelerates the rotation of the frame moving motor 61 to decelerate the moving speed of the moving portion 70 moving in the second direction. The control unit 100 executes the second control after decelerating the rotation of the frame moving motor 61 or after the rotation of the frame moving motor 61 is stopped and the movement of the moving portion 70 to the second direction is stopped.

The height detection unit 20 is configured to detect, by the displacement sensor 27, the displacement of the arm caused by the arm coming into contact with the obstacle, but may be configured to include a sensor configured to detect the height of the obstacle in a non-contact manner. In this case, the distance to lower the medium support unit 31*m* may be determined based on the height of the obstacle detected by the height detection unit 20.

The fact that the height equal to or greater than the threshold was detected by the height detection unit 20 and a guidance display as to whether or not to execute the second control may be displayed on the display unit 95.

When the operation unit 97 receives an instruction to execute the second control, the control unit 100 executes the second control, and executes the third control after executing the second control.

When the operation unit 97 receives an instruction not to execute the second control, the control unit 100 does not execute the second control. When not executing the second control, the control unit 100 needs not execute the third control, or may execute the first control and the third control.

When the user inputs an instruction not to execute the second control, it is determined that the user does not intend to immediately remove the medium M from the medium support unit 31*m*, and the use environment of the user is not contaminated by dripping of the ink, and the third control is also not executed.

The third control is performed in order to suppress contamination of the use environment of the user with the unsolidified ink. When the recording of the image is interrupted and the medium M is removed from the medium support unit 31*m*, if the unsolidified ink is contained, the use environment of the user may be contaminated. Therefore, the third control needs to be performed before the user removes the medium M from the medium support unit 31*m*.

In the third control, the intensity of the irradiation light with which the irradiation unit 89*b* is irradiated is the maximum intensity that can be irradiated by the irradiation unit 89*b*. That is, the intensity of the irradiation light irradiated by the irradiation unit 89*b* by the third control is stronger than the intensity of the irradiation light irradiated after the recording of the image on the medium M by the recording head 89*a*. The irradiation of the irradiation light by the third control is performed for the purpose of solidifying the ink, and the recording state of the image is not considered, and therefore, the irradiation light is emitted with the maximum intensity that can be emitted by the irradiation unit 89*b*.

When executing the third control, the control unit 100 irradiates a part of the medium M on which the ink was already ejected with the irradiation light. In particular, the control unit 100 irradiates, with the irradiation light, a part of the medium M on which ink was already ejected and is not irradiated with the irradiation light.

The control unit 100 causes the storage unit 120 to store information when recording an image on the medium M. This information is information in which detection values of the frame position sensor 92, the table position sensor 93, and the carriage position sensor 94, first information indicating whether or not ink was already ejected, and second information indicating whether or not irradiation light was already emitted are associated with one another.

When a height greater than or equal to the threshold is detected by the height detection unit 20, with reference to the first information, the second information, and the detection value stored in the storage unit 120, the control unit 100 determines the part of the medium M on which ink was already ejected and is not irradiated with the irradiation light. Based on the determination result, the control unit 100 irradiates, with the irradiation light, a part of the medium M on which ink was already ejected and is not irradiated with the irradiation light.

FIG. 1 illustrates the recording device 1 in which the frame drive unit 60 including the frame moving motor 61, the transmission belt 63, the speed change mechanism 65, and the transmission belt 67 is provided in the moving portion 70. However, the medium support unit 31*m* may be provided with the frame drive unit 60, and the medium support unit 31*m* may be configured to be movable in the Y direction. In this case, the control unit 100 moves the table 31 including the medium support unit 31*m* to the +Y-axis direction, which is the second direction, so that the medium M set in the medium support unit 31*m* can be removed after the ink that was already emitted on the medium M by the third control is solidified.

Figure 3:
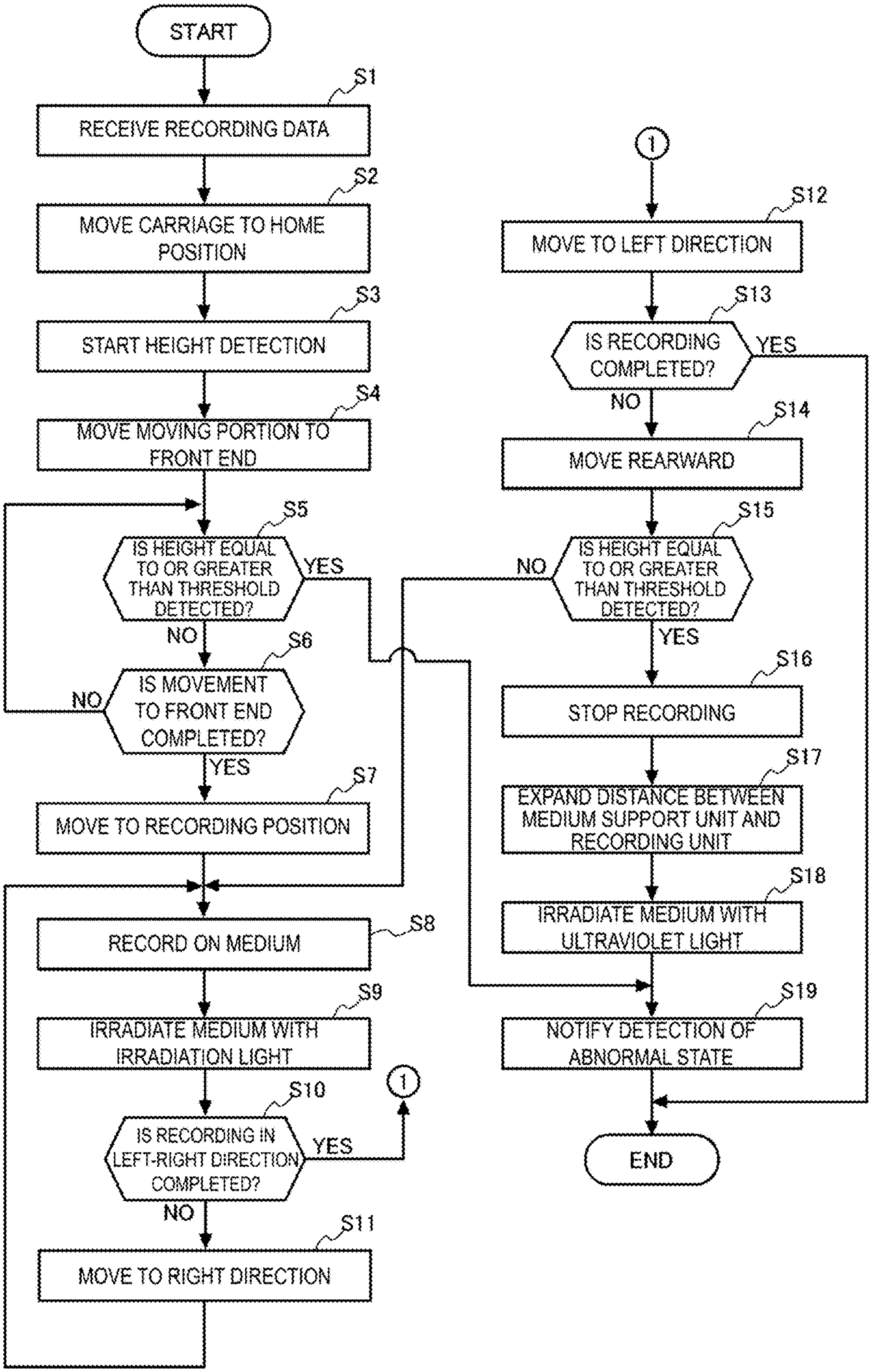
FIG. 3 is a flowchart showing an operation of the recording device.

FIG. 3 is a flowchart showing the operation of the recording device 1.

The operation of the recording device 1 will be described with reference to the flowchart illustrated in FIG. 3.

The control unit 100 acquires recording data via the interface 101 (step S1). The control unit 100 reads a command for instructing recording execution of the recording device 1 from the recording data.

Next, the control unit 100 drives the carriage driving motor 87 to move the carriage 88 to the home position (step S2).

Next, the control unit 100 causes the height detection unit 20 to start height detection (step S3). The frame moving motor 61 is operated to move the moving portion 70 from the rear to the front end in the +Y-axis direction (step S4). The height detection unit 20 detects displacement of the contact plate 24 by detecting displacement of the arm by the displacement sensor 27.

Next, the control unit 100 determines whether or not the height detection unit 20 detected a height equal to or greater than a threshold during forward movement of the moving portion 70 (step S5). If the height detection unit 20 detects a height equal to or greater than the threshold (step S5/YES), the control unit 100 causes the display unit 95 to display that an abnormal state was detected and notifies the user of that (step S19).

If the height equal to or greater than the threshold was not detected by the height detection unit 20 (step S5/NO), the control unit 100 determines whether or not the movement of the moving portion 70 to the front end in the +Y-axis direction is completed (step S6).

If the movement to the front end is not completed (step S6/NO), the control unit 100 returns to step S5 and continues the movement of the moving portion 70 to the front end.

If the movement of the moving portion 70 to the front end is completed (step S6/YES), the control unit 100 drives the carriage driving motor 87 to move the carriage 88 from the home position in the right direction and move the recording head 89*a* to the recording position (step S7).

When the recording head 89*a* is moved to the recording position, the control unit 100 operates the recording head 89*a* to record an image on the medium M (step S8). The recording device 1 ejects ink onto the medium M by the recording head 89*a*, and forms characters, images, and the like included in recording data with the ink ejected onto the medium M.

Next, the control unit 100 irradiates the medium M with irradiation light by the irradiation unit 89*b* (step S9) to solidify the ink.

Next, the control unit 100 determines whether or not the recording in the left-right direction corresponding to the direction along the X-axis was completed at the position in the Y-axis of the recording head 89*a* (step S10). That is, the control unit 100 determines whether or not there is a position for executing recording in the right direction relative to the position in the X-axis of the recording head 89*a* when recording was executed in step S8.

If determining that the recording corresponding to the direction along the X-axis is not completed at the position in the Y-axis of the recording head 89*a* (step S10/NO), the control unit 100 drives the carriage driving motor 87 to move the carriage 88 in the right direction (step S11). Thereafter, the control unit 100 returns to the processing of step S8 and records the image on the medium M.

If the recording corresponding to the direction along the X-axis is completed at the position in the Y-axis of the recording head 89*a* in step S10 (step S10/YES), the control unit 100 operates the carriage driving motor 87 to move the carriage 88 to the home position in the left direction (step S12).

Next, the control unit 100 determines whether or not recording of characters and images on the medium M was completed (step S13). That is, the control unit 100 determines whether or not there is not a position where recording is executed on the medium M in the −Y-axis direction relative to the position in the Y-axis of the recording head 89*a*.

If the control unit 100 determines that the recording of characters and images on the medium M was completed (step S13/YES), the recording device 1 ends a series of operations.

If determining that the recording of characters and images on the medium M is not completed (step S13/NO), the control unit 100 operates the frame moving motor 61 to move the moving portion 70 rearward in the −Y-axis direction by a predetermined amount (step S14). Then, the control unit 100 determines whether or not the height detection unit 20 detected a height equal to or greater than the threshold during the rearward movement of the moving portion 70 (step S15).

If the height detection unit 20 did not detect a height equal to or greater than the threshold (step S15/NO), the control unit 100 returns to step S8 and resumes recording on the medium M.

If the height detection unit 20 detects a height equal to or greater than the threshold in the determination in step S15 (step S15/YES), the control unit 100 executes the first control of stopping recording by the recording head 89*a* (step S16). Then, the control unit 100 executes the second control of expanding the interval between the medium support unit 31*m* and the recording unit 80 (step S17). The control unit 100 drives the lifting motor 33 to move the table 31 in the Z-axis downward direction.

Next, the control unit 100 causes the irradiation unit 89*b* to irradiate the medium M with irradiation light (step S18). At this time, the control unit 100 controls the irradiation unit 89*b* so that the light amount of irradiation light irradiated by the irradiation unit 89*b* becomes greater than the light amount of irradiation light irradiated in step S9.

Thereafter, the control unit 100 causes the display unit 95 to display the detection of the abnormal state to notify the user of it (step S19).

4. Other Embodiments

The above-described embodiment is merely a specific example applied with the present disclosure. The present disclosure is not limited to the configuration of the above-described embodiment, and can be implemented in various aspects without departing from the gist of the disclosure.

For example, in the embodiment described above, the configuration in which the medium support unit 31*m* is provided with the height movement mechanism 32 and the medium support unit 31*m* is moved in a direction along the Z-axis was described. In addition to this, the moving portion 70 or the recording unit 80 may be provided with a height movement mechanism to move the moving portion 70 or the recording unit 80 upward in the Z-axis direction. By moving the moving portion 70 or the recording unit 80 upward in the Z-axis direction, the distance between the medium support unit 31*m* and the moving portion 70 or the recording unit 80 is changed. The height movement mechanism provided to the moving portion 70 or the recording unit 80 corresponds to the first drive unit.

In the above embodiment, the moving portion 70 is configured to be movable forward or rearward in the Y-axis direction, but a drive unit such as a motor or a mechanism for moving the medium support unit 31*m* may be provided, and the medium support unit 31*m* may be configured to be movable forward or rearward in the Y-axis direction. Also in this case, the control unit 100 causes the height detection unit 20 to execute height detection of the medium M when moving the medium support unit 31*m* in the Y-axis direction.

The height detection unit 20 includes the contact plate 24 on which the arm is formed and the displacement sensor 27 configured to detect the displacement of the arm, but may be a sensor configured to detect an obstacle in a non-contact manner.

The configuration of the recording device 1 including the frame position sensor 92, the table position sensor 93, and the carriage position sensor 94 illustrated in FIG. 2 is an example. For example, the recording device 1 may be configured to specify the position of the main frame 71 by detecting the rotation amount of the frame moving motor 61. Similarly, the recording device 1 may be configured to specify the position of the table 31 by detecting the rotation amount of the lifting motor 33, or may be configured to specify the position of the carriage 88 by detecting the rotation amount of the carriage driving motor 87.

In the above-described embodiment, the case where the recording head 89*a* included in the recording unit 80 is a serial head was described, but the recording head 89*a* may be a line head.

At least a part of the functional blocks illustrated in FIG. 2 may be implemented by hardware, or may be configured to be implemented by cooperation of hardware and software. The processing unit of the flowchart of FIG. 3 is divided in accordance with main processing content in order to facilitate understanding of the operation of the recording device 1, and the embodiment is not limited by the way or name of division of the illustrated processing unit.

5. Summary of Present Disclosure

A summary of the present disclosure is added below.

Supplementary Note 1

A recording device including a medium support unit configured to support a medium, a recording unit configured to record an image on the medium with an ink of ultraviolet curing type, an irradiation unit configured to irradiate the medium with an ultraviolet ray, a detection unit configured to detect a height of the medium, and a control unit configured to execute, when a height equal to or greater than a threshold is detected by the detection unit at a time of recording of an image by the recording unit, first control of stopping recording of an image by the recording unit, second control of causing a distance between the medium support unit and the recording unit to be greater than the distance before the detection unit detects a height equal to or greater than the threshold, and third control of irradiating the medium with an ultraviolet ray by the irradiation unit.

According to this configuration, when a height equal to or greater than a threshold is detected by the detection unit, recording of an image by the recording unit is stopped, a distance between the medium support unit and the recording unit is expanded more than the distance before the detection unit detects a height equal to or greater than the threshold, and the medium is irradiated with an ultraviolet ray by the irradiation unit.

For example, if a height equal to or greater than a threshold is detected due to damage of a jig for fixing the medium, peeling of a member for attaching the medium to the medium support unit, or the like in the middle of recording the image, the medium is irradiated with the ultraviolet ray by the irradiation unit, and thus the ink can be solidified. Therefore, when the medium is removed from the medium support unit, the use environment of the user can be suppressed from being contaminated by the ink.

Supplementary Note 2

The recording device according to Supplementary Note 1, further including a moving portion configured to movably support the recording unit in a first direction and is movable in a second direction intersecting the first direction, in which the control unit causes the detection unit to detect the height of the medium when moving the moving portion in the second direction.

According to this configuration, when the moving portion is moved in the second direction, the detection unit can be caused to detect the height of the medium.

Supplementary Note 3

The recording device according to Supplementary Note 2, in which the control unit executes the second control after execution of control of reducing a speed of the moving portion moving in the second direction or after movement of the moving portion in the second direction is stopped.

According to this configuration, the second control is executed after the control of reducing the speed of the moving portion moving in the second direction is executed or after the movement of the moving portion in the second direction is stopped. Therefore, the second operation can be reliably executed.

Supplementary Note 4

The recording device according to Supplementary Note 1, in which the medium support unit is movable in a second direction intersecting a first direction that is a moving direction of the recording unit, and the control unit causes the detection unit to detect the height of the medium when moving the medium support unit in the second direction.

According to this configuration, the detection unit can be caused to detect the height of the medium when the medium support unit is moved in the second direction.

Supplementary Note 5

The recording device according to Supplementary Note 4, in which the control unit moves the medium support unit in the second direction after executing the third control.

According to this configuration, after executing the third control to solidify the ink, the medium support unit is moved in the second direction, and the medium can be removed from the medium support unit. Therefore, it is possible to suppress the use environment of the user from being contaminated by the ink.

Supplementary Note 6

The recording device according to any one of supplementary notes 1 to 5, further including a reception unit configured to receive an operation, in which the control unit executes the second control when the reception unit receives an operation instructing execution of the second control.

According to this configuration, the second control is executed when an operation to instruct execution of the second control is received. Therefore, the user can judge whether or not to execute the second control, and it is possible to prevent control unintended by the user from being performed.

Supplementary Note 7

The recording device according to Supplementary Note 2 or 3, further including a first drive unit configured to drive the moving portion or the recording unit, in which when executing the second control, the control unit drives the first drive unit to expand a distance between the moving portion or the recording unit and the medium support unit more than the distance before the detection unit detects the height equal to or greater than the threshold.

According to this configuration, by driving the moving portion or the recording unit by the first drive unit, the space between the moving portion or the recording unit and the medium support unit can be changed to be greater than that before the detection unit detects the height equal to or greater than the threshold.

Supplementary Note 8

The recording device according to Supplementary Note 4, further including a second drive unit configured to drive the medium support unit, in which when executing the second control, the control unit drives the second drive unit to cause a distance between the medium support unit and the recording unit to be greater than the distance before the detection unit detects the height equal to or greater than the threshold.

According to this configuration, by driving the medium support unit by the second drive unit, the space between the recording unit and the medium support unit can be changed to be greater than that before the detection unit detects the height equal to or greater than the threshold.

Supplementary Note 9

The recording device according to Supplementary Note 6, in which the control unit does not execute the third control when not executing the second control.

According to this configuration, when the second control is not executed, the third control is not executed. If the medium is not moved from the medium support unit, there is no risk that the use environment of the user is contaminated by the ink discharged on the medium, and thus, it is possible to prevent the recording device from executing an unnecessary operation.

Supplementary Note 10

The recording device according to any one of Supplementary Notes 1 to 9, in which the control unit controls the irradiation unit so that an irradiation intensity of an ultraviolet ray that the irradiation unit is caused to emit by the third control is stronger than an irradiation intensity of an ultraviolet ray emitted by the irradiation unit after the recording unit records an image on the medium.

According to this configuration, the irradiation intensity of the ultraviolet ray irradiated by the third control is stronger than the irradiation intensity of the ultraviolet ray irradiated after the recording of the image on the medium. Therefore, the ink discharged onto the medium can be dried in a short time, and the use environment of the user can be suppressed from being contaminated by the ink.

Supplementary Note 11

The recording device according to any one of Supplementary Notes 1 to 10, in which the control unit causes a part of the medium on which an image that was recorded by the recording unit, the part of the medium that was not irradiated with the ultraviolet ray by the irradiation unit, to be irradiated with the ultraviolet ray.

According to this configuration, the part of the medium on which the image is formed by the ink, the part of the medium not irradiated with the ultraviolet ray, is irradiated with the ultraviolet ray. Therefore, a toner that is not irradiated with ultraviolet rays and is not solidified can be efficiently solidified.

Supplementary Note 12

A recording method of causing a processor mounted on a recording device including a medium support unit configured to support a medium, a recording unit configured to record an image on the medium with an ink of ultraviolet curing type, an irradiation unit configured to irradiate the medium with an ultraviolet ray, and a detection unit configured to detect a height of the medium to execute, the recording method including when a height equal to or greater than a threshold is detected by the detection unit at a time of recording of an image by the recording unit, stopping recording of an image by the recording unit, causing a distance between the medium support unit and the recording unit to be greater than the distance before the detection unit detects a height equal to or greater than the threshold, and irradiating the medium with an ultraviolet ray by the irradiation unit.

According to this configuration, when a height equal to or greater than a threshold is detected by the detection unit, recording of an image by the recording unit is stopped, a distance between the medium support unit and the recording unit is expanded more than the distance before the detection unit detects a height equal to or greater than the threshold, and the medium is irradiated with an ultraviolet ray by the irradiation unit.

For example, if a height equal to or greater than a threshold is detected due to damage of a jig for fixing the medium, peeling of a member for attaching the medium to the medium support unit, or the like in the middle of recording the image, the medium is irradiated with the ultraviolet ray by the irradiation unit, and thus the ink can be solidified. Therefore, when the medium is removed from the medium support unit, the use environment of the user can be suppressed from being contaminated by the ink.

What is claimed is:

1. A recording device comprising:

a medium support unit configured to support a medium;

a recording unit configured to record an image on the medium with an ink of ultraviolet curing type;

an irradiation unit configured to irradiate the medium with an ultraviolet ray;

a detection unit configured to detect a height of the medium; and a control unit configured to execute, when a height equal to or greater than a threshold is detected by the detection unit at a time of recording of an image by the recording unit, first control of stopping recording of an image by the recording unit, second control of causing a distance between the medium support unit and the recording unit to be greater than the distance before the detection unit detects a height equal to or greater than the threshold, and third control of irradiating the medium with an ultraviolet ray by the irradiation unit.

2. The recording device according to claim 1, further comprising:

a moving portion configured to movably support the recording unit in a first direction and is movable in a second direction intersecting the first direction, wherein the control unit causes the detection unit to detect the height of the medium when moving the moving portion in the second direction.

3. The recording device according to claim 2, wherein the control unit executes the second control after execution of control of reducing a speed of the moving portion moving in the second direction or after movement of the moving portion in the second direction is stopped.

4. The recording device according to claim 1, wherein the medium support unit is movable in a second direction intersecting a first direction that is a moving direction of the recording unit, and the control unit causes the detection unit to detect the height of the medium when moving the medium support unit in the second direction.

5. The recording device according to claim 4, wherein the control unit moves the medium support unit in the second direction after executing the third control.

6. The recording device according to claim 1, further comprising:

a reception unit configured to receive an operation, wherein the control unit executes the second control when the reception unit receives an operation instructing execution of the second control.

7. The recording device according to claim 2, further comprising:

a first drive unit configured to drive the moving portion or the recording unit, wherein when executing the second control, the control unit drives the first drive unit to expand a distance between the moving portion or the recording unit and the medium support unit more than the distance before the detection unit detects the height equal to or greater than the threshold.

8. The recording device according to claim 4, further comprising:

a second drive unit configured to drive the medium support unit, wherein when executing the second control, the control unit drives the second drive unit to cause a distance between the medium support unit and the recording unit to be greater than the distance before the detection unit detects the height equal to or greater than the threshold.

9. The recording device according to claim 6, wherein the control unit does not execute the third control when not executing the second control.

10. The recording device according to claim 1, wherein the control unit controls the irradiation unit so that an irradiation intensity of an ultraviolet ray that the irradiation unit is caused to emit by the third control is stronger than an irradiation intensity of an ultraviolet ray emitted by the irradiation unit after the recording unit records an image on the medium.

11. The recording device according to claim 1, wherein the control unit causes a part of the medium on which an image that was recorded by the recording unit, the part of the medium that was not irradiated with the ultraviolet ray by the irradiation unit, to be irradiated with the ultraviolet ray.

12. A recording method of causing a processor mounted on a recording device including a medium support unit configured to support a medium, a recording unit configured to record an image on the medium with an ink of ultraviolet curing type, an irradiation unit configured to irradiate the medium with an ultraviolet ray, and a detection unit configured to detect a height of the medium to execute, the recording method comprising:

when a height equal to or greater than a threshold is detected by the detection unit at a time of recording of an image by the recording unit, stopping recording of an image by the recording unit;

causing a distance between the medium support unit and the recording unit to be greater than the distance before the detection unit detects a height equal to or greater than the threshold; and irradiating the medium with an ultraviolet ray by the irradiation unit.

* * * * *